Patented May 28, 1935    2,002,547

UNITED STATES PATENT OFFICE 2,002,547

METHOD OF DECOMPOSING RAW PHOSPHATES

Sven Gunnar Nordengren, Landskrona, Sweden, assignor to Aktiebolaget Kemiska Patenter, Landskrona, Sweden, a Swedish joint-stock company No Drawing. Application September 23, 1931, Serial No. 564,720. In Sweden September 1, 1931

9 Claims. (Cl. 23—165)

It is known from the United States Letters Patent No. 1,776,595 to treat raw phosphates with sulphuric acid in such a manner that the calcium sulphate formed in the reaction is obtained as semihydrate, $CaSO_4 \cdot \tfrac{1}{2}H_2O$, or with less water of hydration, or as anhydrite, or as a mixture of these bodies, and to separate it in this form or forms from the phosphoric acid. The object is to obtain the calcium sulphate in an easily separable form.

It has now been found that the semihydrate as well as the anhydrite may be obtained in two forms, one of which is stable and the other unstable. The stable form is not subjected to changes when washed or treated with water, whereas the unstable form when treated in this way takes up water and is converted into the dihydrate $CaSO_4 \cdot 2H_2O$, probably as follows:

$$4CaSO_4 \cdot \tfrac{1}{2}H_2O \rightarrow CaSO_4 \cdot 2H_2O + 3CaSO_4$$
$$3CaSO_4 + 6H_2O \rightarrow 3CaSO_4 \cdot 2H_2O$$

In accordance herewith the present invention, which relates to decomposition of raw phosphates, apatite or other phosphoric acid-containing material in the presence of the sulphuric acid radical, consists in subjecting the reaction mass during or after the decomposition by heating to such a solution vapor pressure that the calcium sulphate present therein becomes sufficiently stable to permit washing or treatment with water, diluted phosphoric acid etc. without substantial change of the contents of water of hydration in the mass or any part thereof.

Of importance are the three factors temperature, concentration and time. Of these the most important are the temperature and the concentration, and the relation between these to obtain the desired stable form may be expressed by the equation

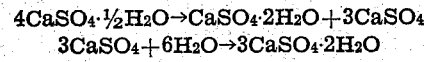

where $p$ is the concentration of the phosphoric acid present at or after the reaction, expressed as per cent by weight of $P_2O_5$ in the mother liquor, and $t$ the temperature at the stabilization in degrees centigrade. In actual practice it may be preferable to use a somewhat higher temperature, for example 5–10° C. higher.

The following test is submitted to show the effect of the temperature on the stabilization of the calcium sulphate in the presence of phosphoric acid containing 33% $P_2O_5$. Semihydrate $CaSO_4 \cdot \tfrac{1}{2}H_2O$ was treated with technically pure phosphoric acid of the said concentration at different temperatures, whereafter the contents of water of hydration were determined. The separated precipitate was then treated with water during two hours at ordinary temperature and the percentage of water of hydration again determined:

| Mean temperature | Maximum temperature | Maximum pressure above the atmospheric pressure | Contents of crystal water before and after the treatment with water | |
|---|---|---|---|---|
| | | | Before | After |
| 100 | 100 | | 5,74 | 13,09 |
| 109 | 109 | | 5,16 | 13,5 |
| 110 | 110 | | 5,01 | 11,43 |
| 115 | 117 | 1,8 | 5,52 | 5,53 |
| 122 | 125 | 3,2 | 4,35 | 4,27 |

It is pointed out that the temperatures were determined in the vapor space of the vessel and that the calcium sulphate by contact with the walls of the vessel probably was heated to a somewhat higher temperature.

It will be seen that after heating to a temperature above 117° C. a sufficiently stable semihydrate was obtained to permit treatment with water at ordinary temperatures during two hours without increase of the water of hydration. Such a temperature is however above the boiling point of the phosphoric acid and the stabilization must therefore in this case be carried out in a closed vessel. If, however, the concentration of the phosphoric acid is increased the stabilization may be carried out at a temperature corresponding to or lower than the boiling point of the phosphoric acid, i. e. in an open vessel. It has also been found that the degree of stabilization, which can be expressed in terms of the time the calcium sulphate can remain in contact with water without substantial increase of the water of hydration, increases with the concentration but that also the time of the treatment is of importance.

By means of tests such as that described above it should be possible for anybody skilled in the art to find in each case the conditions for obtaining a sufficiently stable calcium sulphate.

It has further been found that if the raw phosphate is treated with more sulphuric acid than necessary for the decomposition and then more raw phosphate is added until all the sulphuric acid is consumed, a stable calcium sulphate is more easily obtained, i. e. at a lower temperature, than if the whole quantity of raw phosphate is added at once.

It has also been found that in order to obtain in the decomposition of raw phosphates a phosphoric acid which is sufficiently strong to permit stabilization of the semihydrate without decomposing in a closed vessel it is necessary to add phosphoric acid, which is known per se. On the other hand it is not known that this addition of phosphoric acid should be of a certain quantity. This quantity may be determined by experiments for different concentrations, but in order to ensure a practically usable degree of stabilization it should be greater than the quantity of the phosphoric acid formed in the reaction. This has to do with the vapor tension of the water of hydration of the calcium sulphate and the vapor tension of the solution, as explained in the specification of Patent No. 1,776,595 and further with the necessity of having a certain quantity of water present in order to ensure complete or nearly complete dissolving out of the phosphoric acid, which in turn probably is due to the fact that when insufficient water is present insoluble double salts between the calcium sulphate and the calcium compounds of the phosphoric acid are formed. These double salts are probably intermediary products in the reaction between the tricalcium phosphate and the sulphuric acid and the solubility thereof may depend upon the fact that the compounds may crystallize with more or less water of hydration. When decomposing in open vessels the limit may probably be put at phosphoric acid containing at least 36 per cent by weight of $P_2O_5$; the quantity of the phosphoric acid added should be at least equal to that of the phosphoric acid formed by the decomposition. The phosphoric acid added may first be mixed with the raw phosphate or the phosphoric acid-containing raw material and brought to react therewith at ordinary or increased temperature, and the sulphuric acid then added.

The decomposition may be carried out with other acids than sulphuric acid but the sulphuric acid radical should be present or afterwards supplied to the reaction mixture.

A reaction mass which has been previously produced may also be stabilized by heating with sulphuric acid and then adding a corresponding quantity of raw phosphate; the sulphuric acid is then for determination of the required temperature calculated as the equivalent amount of phosphoric acid.

The phosphoric acid formed may directly during the reaction be converted into phosphate.

What I claim is:—

1. The process for decomposing raw materials containing phosphoric acid and calcium, which consists in treating said materials with mineral acid in the presence of sulphuric acid radical to produce decomposition, subjecting the reaction mass at the latest after said inital decomposition to such a solution vapor pressure that the calcium sulphate produced will take up at most ½ mol. of water of crystallization and thereby form stable crystals which may safely be subjected to washing with aqueous liquids and yet retain their content of water of crystallization unaltered in amount, by regulating the concentration of the phosphoric acid present in the mass and the temperature according to the formula $2P+t=$ at least 186 when $P=$ concentration of the phosphoric acid expressed in percentage of weight of $P_2O_5$ of the mother liquor, and $t=$ the temperature in °C.

2. The process according to claim 1, wherein there is added to the raw material at the latest during the decomposition thereof phosphoric acid from a preceding operation in a sufficiently high degree of concentration to conform to the conditions of the given formula.

3. The process according to claim 1, wherein there is added to the raw material at the latest during the decomposition thereof reaction mass from a preceding operation in a sufficiently high degree of concentration to conform to the given formula.

4. The process according to claim 1, wherein phosphoric acid is added to the reaction mass in a sufficient amount to contain more $P_2O_5$ than is newly formed from the raw materials being decomposed and the decomposition then carried out in the presence of such phosphoric acid.

5. The process for decomposing raw materials containing phosphoric acid and calcium, which consists in first mixing said raw materials with phosphoric acid and causing the materials to react therewith, then treating said materials with mineral acid in the presence of sulphuric acid radical to produce decomposition, subjecting the reaction mass at the latest after said initial decomposition to such a solution vapor pressure that the calcium sulphate produced will take up at most ½ mol. of water of crystallization and thereby form stable crystals which may safely be subjected to washing with aqueous liquids and yet retain their content of water of crystallization unaltered in amount, by regulating the concentration of the phosphoric acid present in the mass and the temperature according to the formula $2P+t=$ at least 186 when $P=$ concentration of the phosphoric acid expressed in percentage of weight of $P_2O_5$ of the mother liquor, and $t=$ the temperature in degrees C.

6. The process for decomposing raw materials containing phosphoric acid and calcium, which consists in first treating solely a portion of the raw materials intended to be treated with mineral acid in the presence of sulphuric acid radical to produce decomposition, subjecting the resulting reaction mass at the latest after said initial decomposition to such a solution vapor pressure that the calcium sulphate produced will take up at most ½ mol. of water of crystallization and thereby form stable crystals which may safely be subjected to washing with aqueous liquids and yet retain their content of water of crystallization unaltered in amount, by regulating the concentration of the phosphoric acid present in the mass and the temperature according to the formula $2P+t=$ at least 186 when $P=$ concentration of the phosphoric acid expressed in percentage of weight of $P_2O_5$ of the mother liquor, and $t=$ the temperature in degrees C. and thereafter adding the remainder of the raw materials to be treated to the reaction mass in order to again produce decomposition, and repeating the treatment of the reaction mass in respect to solution vapor pressure and regulation of the concentration of the phosphoric acid present in the mass as well as the temperature, according to said formula.

7. The process for decomposing raw materials containing phosphoric acid and calcium, which consists in treating said materials with mineral acid other than sulphuric acid and sulphate radical to produce decomposition, subjecting the reaction mass at the latest after said inital decomposition to such a solution vapor pressure that the calcium sulphate produced will take up at most ½ mol. of water of crystallization and thereby form stable crystals which may safely be subjected to washing with aqueous liquids and yet retain their content of water of crystallization unaltered in amount, by regulating the concentration of the phosphoric acid present in the mass and the temperature according to the formula $2P+t=$ at least 186 when $P=$ concentration of $P_2O_5$ of the mother liquor, and $t=$ the temperature in degrees C., and finally adding sulphuric acid radical to the mass.

8. The process for decomposing raw materials containing phosphoric acid and calcium, which consists in treating said materials with mineral acid other than sulphuric acid to produce decomposition, when said initial decomposition is complete adding sulphuric acid radical to the reaction mass, subjecting the reaction mass at the latest after the resulting decomposition to such a solution vapor pressure that the calcium sulphate produced will take up at most ½ mol. of water of crystallization and thereby form stable crystals which may safely be subjected to washing with aqueous liquids and yet retain their content of water of crystallization unaltered in amount, by regulating the concentration of the phosphoric acid present in the mass and the temperature according to the formula $2P+t=$ at least 186 when $P=$ concentration of the phosphoric acid expressed in percentage of weight of $P_2O_5$ of the mother liquor, and $t=$ the temperature in degrees C.

9. The process according to claim 1, wherein the stable calcium sulphate associated with the phosphoric acid in the resulting mixture is retained therein and said mixture is then caused to react upon crude phosphate material.

SVEN GUNNAR NORDENGREN.